(12) United States Patent
Wu et al.

(10) Patent No.: US 8,644,634 B2
(45) Date of Patent: Feb. 4, 2014

(54) METHOD AND SYSTEM FOR MEASURING LENS QUALITY

(75) Inventors: Wen-Yi Wu, Shenzhen (CN); Huo-Ping Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 939 days.

(21) Appl. No.: 12/712,180

(22) Filed: Feb. 24, 2010

(65) Prior Publication Data

US 2011/0157390 A1 Jun. 30, 2011

(30) Foreign Application Priority Data

Dec. 25, 2009 (CN) .......................... 2009 1 0312232

(51) Int. Cl.
*G06K 9/40* (2006.01)
(52) U.S. Cl.
USPC ...... 382/255; 348/222.1; 356/124; 356/124.5
(58) Field of Classification Search
USPC ....................................... 382/255; 348/222.1
See application file for complete search history.

(56) References Cited

U.S. PATENT DOCUMENTS

| | | | | |
|---|---|---|---|---|
| 4,274,737 A * | 6/1981 | Howland | .................... | 356/124.5 |
| 5,134,667 A * | 7/1992 | Suzuki | ..................... | 382/164 |
| 5,144,686 A * | 9/1992 | Yumiba: Takashi et al. | . | 382/263 |
| 5,155,558 A * | 10/1992 | Tannenbaum et al. | ........ | 356/446 |
| 5,303,023 A * | 4/1994 | Portney et al. | ............. | 356/124.5 |
| 5,351,138 A * | 9/1994 | Sasaki et al. | .................. | 358/462 |
| 5,408,339 A * | 4/1995 | Sasaki et al. | .................. | 358/462 |
| 5,432,611 A * | 7/1995 | Haneda et al. | ............... | 358/3.02 |
| 5,446,802 A * | 8/1995 | Tada et al. | ..................... | 382/170 |
| 5,473,440 A * | 12/1995 | Haneda et al. | ............... | 358/300 |
| 5,726,746 A * | 3/1998 | Park et al. | .................. | 356/124.5 |
| 5,886,797 A * | 3/1999 | Shimura | ....................... | 382/266 |
| 5,917,578 A * | 6/1999 | Nakamura | ..................... | 355/40 |
| 5,995,248 A * | 11/1999 | Katori et al. | .................... | 358/2.1 |
| 6,072,570 A * | 6/2000 | Chipman et al. | .............. | 356/124 |
| 6,437,857 B1 * | 8/2002 | Stockton | ........................ | 356/124 |
| 6,760,097 B2 * | 7/2004 | Kitabayashi et al. | ...... | 356/124.5 |
| 6,788,401 B1 * | 9/2004 | Kitabayashi et al. | ......... | 356/124 |
| 7,187,643 B2 * | 3/2007 | Isshiki et al. | ............... | 369/275.4 |
| 7,634,183 B2 * | 12/2009 | Chin et al. | ....................... | 396/89 |
| 2002/0044275 A1 * | 4/2002 | Kitabayashi et al. | ......... | 356/124 |
| 2003/0026456 A1 * | 2/2003 | Akutagawa | ................... | 382/104 |
| 2004/0252195 A1 * | 12/2004 | Lu et al. | ......................... | 348/188 |
| 2006/0139492 A1 * | 6/2006 | Ahn et al. | ...................... | 348/558 |
| 2006/0239549 A1 * | 10/2006 | Kelly et al. | .................... | 382/167 |
| 2007/0071349 A1 * | 3/2007 | Chin et al. | ..................... | 382/255 |

(Continued)

OTHER PUBLICATIONS

Bob Atkins, "Modulation Transfer Function—what is it and why does it matter?", Apr. 2007, http://photo.net/learn/optics/mtf/ , p. 1-9.*

(Continued)

*Primary Examiner* — Gandhi Thirugnanam
(74) *Attorney, Agent, or Firm* — Altis Law Group, Inc.

(57) ABSTRACT

A method for measuring lens quality includes receiving and transmitting an image's information to a location module through an image collecting module. A location module partitions the image's information into a plurality of measure areas. An image processing module computes the Modulation Transfer Function (MTF) of each measure area. A comparing module compares the MTF with a predetermined MTF to determine quality of the lenses.

6 Claims, 7 Drawing Sheets

(56) References Cited

U.S. PATENT DOCUMENTS

| | | | |
|---|---|---|---|
| 2007/0152062 A1* | 7/2007 | He et al. | 235/462.32 |
| 2007/0206237 A1* | 9/2007 | Oguri | 358/482 |
| 2008/0084584 A1* | 4/2008 | Kauhanen | 358/3.27 |
| 2008/0088887 A1* | 4/2008 | Morikawa | 358/447 |
| 2009/0147245 A1* | 6/2009 | Yuan | 356/124 |
| 2010/0302562 A1* | 12/2010 | Bonnier et al. | 358/1.9 |
| 2011/0157390 A1* | 6/2011 | Wu et al. | 348/222.1 |
| 2011/0227988 A1* | 9/2011 | Yamazaki | 347/19 |
| 2011/0234816 A1* | 9/2011 | Lyu et al. | 348/207.1 |
| 2011/0292276 A1* | 12/2011 | Terashima | 348/348 |
| 2012/0268579 A1* | 10/2012 | Zhao et al. | 348/65 |

OTHER PUBLICATIONS

L. R. Baker and T. Moss, "Electro-Optical Methods of Image Evaluation", Opt. Eng. 8(6), 806213 (Sep. 1, 1970), p. 213-222.*

Optikos Corporation, "How to Measure MTF and other Properties of Lenses", Jul. 16, 1999, http://www.optikos.com/resource_files/pdfs/how_to_measure_mtf.pdf, p. 1-64.*

* cited by examiner

MTF Basic

MTF ─────────────────────────

☑ Top:

[46] [27]
X(%) Y(%)

TestRectanglewidth(P): [150]
TestRectangleHeight(p): [150]

☑ Left: ☑ Right:

[8] [45]  [85] [45]
X(%) X(%)  X(%) X(%)

☑ Bottom:

[46] [64]
X(%) Y(%)

MTF SPECIFICATION

[0] (%) *LeftMTF+
[0] (%) *RightMTF+
[0] (%) *TopMTF+
[0] (%) *BottomMtf+(<<&>>) [0.6] (+/−) [0.1]
                            Expect      Error

[Default] [FromFile]   [OK]   [Cancle]  [Apply]

FIG. 6

METHOD AND SYSTEM FOR MEASURING LENS QUALITY

BACKGROUND

1. Technical Field

The present disclosure relates to a method and a system for measuring the quality of lenses.

2. Description of Related Art

Mobile terminal devices, such as mobile phones, usually have a camera module. The camera module includes a lens, and the lens should be tested before going to market. Typically, the lens imaging ability is checked by a technician looking at images captured using the lens, which is time-consuming and inaccurate.

BRIEF DESCRIPTION OF THE DRAWINGS

FIG. 6 is a schematic view of a user interface of a system for measuring the quality of lenses.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, for example, Java, C, or Assembly. One or more software instructions in the modules may be embedded in firmware, such as an EPROM. It will be appreciated that modules may comprised of connected logic units, such as gates and flip-flops, and may also comprise of programmable units, such as programmable gate arrays or processors. The modules described herein may be implemented as both software and/or hardware modules and may be stored in any type of computer-readable medium or other computer storage device.

Figure 1:
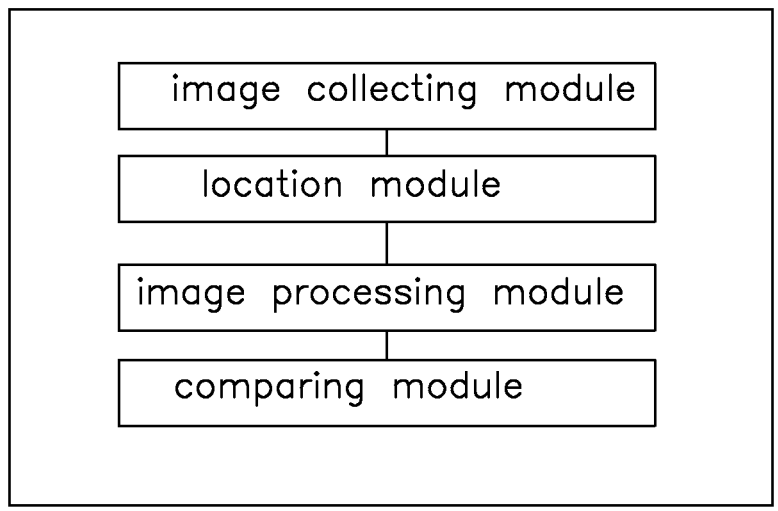
FIG. 1 is a block view of an embodiment of a system for measuring the quality of lenses.

Referring to FIG. 1, a system for measuring lenses includes an image collecting module, a location module, an image processing module and a comparing module. The image collecting module receives and transmits an image's information to the location module. The location module uses a plurality of measurable areas in the image's information. The image processing module computes a first Modulation Transfer Function (MTF) and a third MTF of each measurable area. The comparing module compares the third MTF with a predetermined MTF to determine quality of the lenses.

Figure 2:
FIG. 2 is a schematic view of a testing card.
Figure 3:
FIG. 3 is a schematic view of an ideal image of FIG. 2.
Figure 4:
FIG. 4 is a schematic view of an actual image of FIG. 2.

FIG. 2 is a schematic view of a testing card. FIG. 3 is a schematic view of an ideal image of FIG. 2. FIG. 4 is a schematic view of an actual image of FIG. 2. The ideal image is the same using the testing card.

Figure 5:
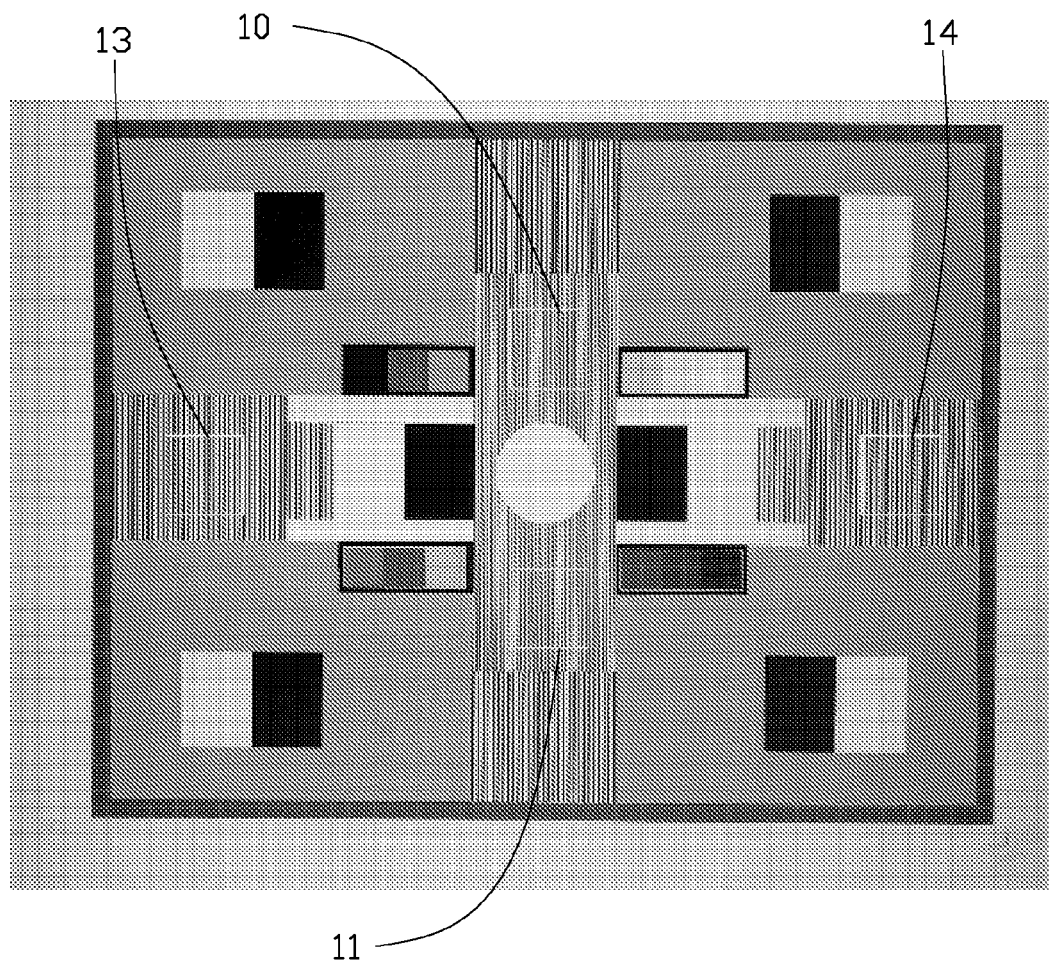
FIG. 5 is a schematic view of a testing picture.

Referring to FIGS. 5-6, the location module partitions the image into a plurality of measured areas. Width and height, coordinates of each measured area may be input through user inputted value. In one embodiment, the location module locates four areas 10-13 for testing. The first MTF of each measured area occupies different percentages. The image processing module computes the third MTF of the image's information based on the first MTF of each measured area and percentage.

The image processing module computes a gray value of each pixel to determine whether each pixel is black or white. In one embodiment, the gray value is greater than 200 as white, and the gray value is less than 200 as black. The image processing module computes the average gray value of each line to determine whether the line is black or white and computes the number of the black and white lines. The image processing module drops the last line to get a matching number of black and white lines when the number of the black lines is even and the number of the white lines is odd. This process is repeated if the number of white lines is even and the number of black lines is odd. The image processing module computes a second MTF of the adjacent black and white lines through differential coefficient. The image processing module computes the first MTF of each measure area according to the differential coefficient of the second MTF. In one embodiment, when the third MTF of the image's information satisfies 0.5~0.7, the lens has reached the standard.

Figure 7:
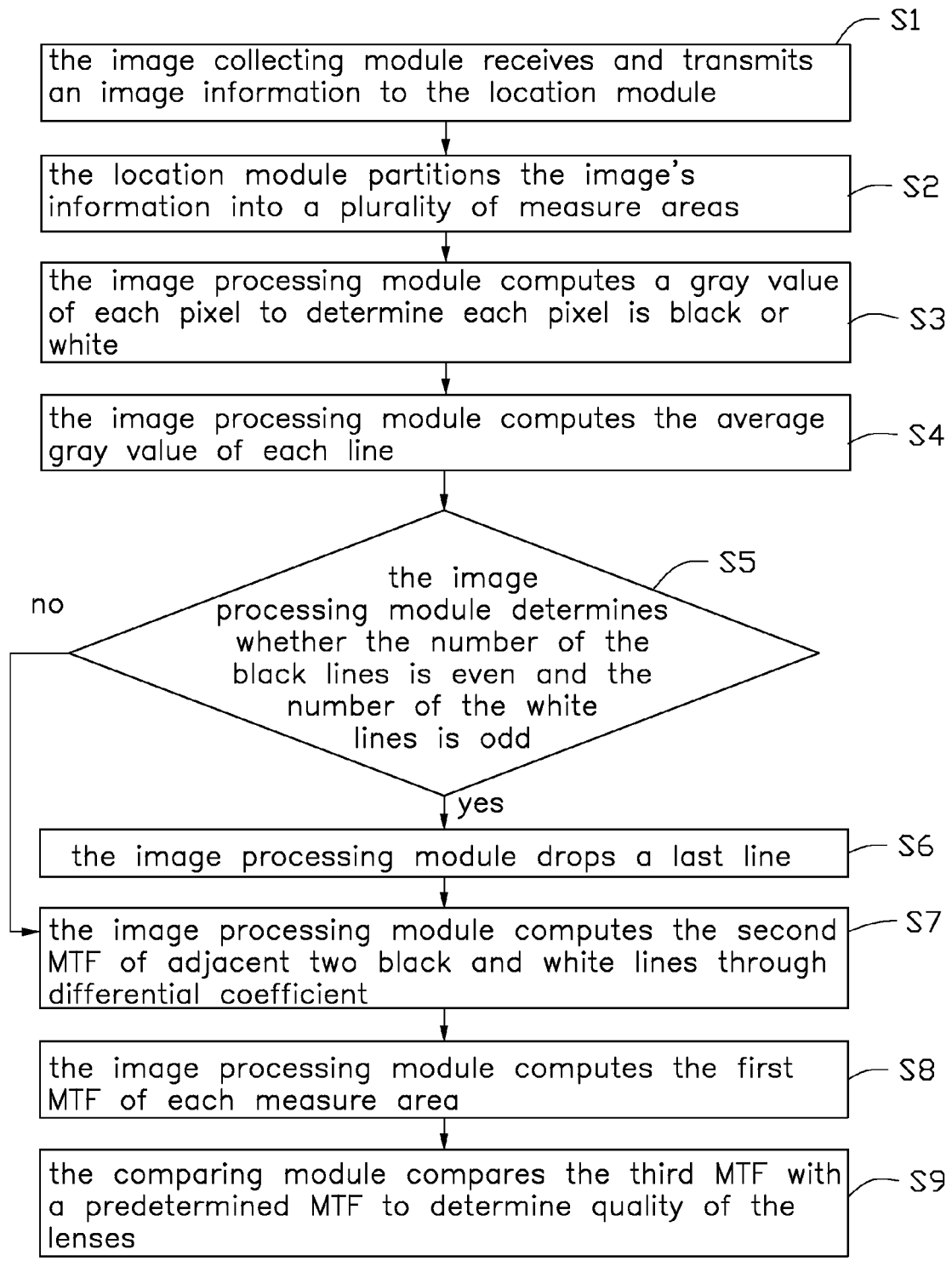
FIG. 7 is a flowchart of a method for measuring the quality of lenses.

Referring to FIG. 7, one embodiment of a method for measuring lens quality includes the following blocks.

In block S1, the image collecting module receives and transmits an image's information to the location module.

In block S2, the location module partitions the image's information into a plurality of measure areas.

In block S3, the image processing module computes a gray value of each pixel to determine whether each pixel is black or white.

In block S4, the image processing module computes the average gray scale of each line, to determine whether the line is black or white, and the number of the black and white lines.

In block S5, the image processing module determines whether the number of the black lines is even and the number of the white lines is odd or the number of the white lines is even and the number of the black lines is odd. If yes, go on S6; if no, skip to S7. A single black line or white line would influence the exactness of the MTF.

In block S6, the image processing module drops a last line.

In block S7, the image processing module computes a second MTF of adjacent two black and white lines through differential coefficient.

In block S8, the image processing module computes the first MTF of each measured area according to the differential coefficient of the second MTF. The image processing module computes the third MTF value of the image information based on the first MTF of each measured area.

In block S9, the comparing module compares the third MTF with a predetermined MTF to determine quality of the lenses.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for measuring lens quality, comprising:

receiving and transmitting an image's information to a location module through an image collecting module;

partitioning the image's information into a plurality of measure areas by a location module, wherein each of the measure areas shows a plurality of black and white lines;

computing an average gray value of the plurality of black and white lines to determine if each of the black and white lines is black or white by an image processing module the image processing module computing a second MTF of adjacent ones of the black and white lines based on the average gray value;

computing a first Modulation Transfer Function (MTF) of each of the measure areas according to the second MTF by the image processing module;

computing a third MTF of the image's information based on the first MTF of each of the measured areas;

comparing the third MTF with a predetermined MTF.

2. The method of claim 1, wherein the image processing module drops a last line for matching the number of black and white lines when the number of the black lines is even and the number of the white lines is odd.

3. The method of claim 1, wherein the image processing module drops a last line for matching the number of black and white lines when the number of the white lines is even and the number of the black lines is odd.

4. The method of claim 1, wherein the image processing module computes the average gray value of each line to determine the number of the black and white lines.

5. The method of claim 4, wherein the image processing module computes a gray value of each pixel of each line to obtain the average gray value of each line.

6. The method of claim 1, wherein the location module determines width, height, and coordinates of each measure area.

* * * * *